(12) United States Patent
Kim

(10) Patent No.: US 11,433,741 B2
(45) Date of Patent: Sep. 6, 2022

(54) VEHICLE AIR VENT

(71) Applicant: HYUNDAI MOBIS CO., LTD., Seoul (KR)

(72) Inventor: Won Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 7 days.

(21) Appl. No.: 16/891,745

(22) Filed: Jun. 3, 2020

(65) Prior Publication Data

US 2020/0406722 A1 Dec. 31, 2020

(30) Foreign Application Priority Data

Jun. 28, 2019 (KR) .................. 10-2019-0077790

(51) Int. Cl.
*B60H 1/34* (2006.01)
*B60H 1/00* (2006.01)

(52) U.S. Cl.
CPC ......... *B60H 1/3428* (2013.01); *B60H 1/0065* (2013.01); *B60H 1/00564* (2013.01); *B60H 1/00671* (2013.01); *B60H 2001/00721* (2013.01)

(58) Field of Classification Search
CPC B60H 1/00564; B60H 1/0065; B60H 1/3428; B60H 2001/00721; B60H 2001/3478
USPC ........................................................ 454/154
See application file for complete search history.

(56) References Cited

U.S. PATENT DOCUMENTS

| 3,824,910 A * | 7/1974 | Temming ............... B60H 1/345 454/154 |
| 3,988,973 A * | 11/1976 | Honmann ................. E04B 9/02 454/286 |
| 4,092,907 A * | 6/1978 | Meyer ....................... B60H 1/24 251/352 |
| 2003/0157880 A1* | 8/2003 | Nishida ................ B60H 1/3414 454/155 |

(Continued)

FOREIGN PATENT DOCUMENTS

| CN | 111055658 A * | 4/2020 | ........... B60H 1/3421 |
| DE | 19807290 A1 * | 10/1999 | ........... B60H 1/3428 |

(Continued)

OTHER PUBLICATIONS

Machine Translation of Schwentner et al (Year: 1999).*

(Continued)

*Primary Examiner* — Vivek K Shirsat
(74) *Attorney, Agent, or Firm* — NSIP Law

(57) ABSTRACT

Disclosed herein is a vehicle air vent that includes a duct having a channel therein through which air flows, and a discharge end through which the air is discharged, a first adjuster installed in the duct so as to be rotatable about a first rotary shaft, an extending direction of a first opening being varied depending on the angle of rotation of the first adjuster, a second adjuster installed in the duct so as to be rotatable about a second rotary shaft, an extending direction of a second opening being varied depending on the angle of rotation of the second adjuster, a third adjuster installed on the discharge end so as to be rotatable about a third rotary shaft, a third opening being defined between the third adjuster and the duct, and an interlocking connector operatively connecting the first adjuster to the third adjuster.

9 Claims, 10 Drawing Sheets

(56) References Cited

U.S. PATENT DOCUMENTS

| | | | | |
|---|---|---|---|---|
| 2004/0127153 A1* | 7/2004 | Demerath | ............ | B60H 1/3421 |
| | | | | 454/155 |
| 2004/0262454 A1* | 12/2004 | Lehmbecker | ......... | B64C 1/1407 |
| | | | | 244/129.5 |
| 2007/0184774 A1* | 8/2007 | Balzo | ................ | B60H 1/00857 |
| | | | | 454/143 |
| 2008/0146139 A1* | 6/2008 | Terai | .................... | B60H 1/3421 |
| | | | | 454/155 |
| 2013/0078900 A1* | 3/2013 | Zalan | .................. | B60H 1/3421 |
| | | | | 454/152 |
| 2017/0080781 A1* | 3/2017 | Kwak | .................. | B60H 1/3421 |
| 2019/0270363 A1* | 9/2019 | Hoerschler | .......... | B60H 1/3414 |
| 2019/0359034 A1* | 11/2019 | Dinant | ................ | B60H 1/3428 |

FOREIGN PATENT DOCUMENTS

| | | | | |
|---|---|---|---|---|
| DE | 102017011497 A1 * | 6/2019 | ........... | B60H 1/3428 |
| EP | 2993068 A1 * | 3/2016 | .............. | F24F 13/15 |
| FR | 2809349 A1 * | 11/2001 | ........... | B60H 1/3421 |
| KR | 10-2010-0058374 A | 6/2010 | | |

OTHER PUBLICATIONS

EFunda, "Gears: Compound Train", 2000 (Year: 2000).*
Machine Translation of Caodoro et al (Year: 2001).*
Machine Translation of Matrane et al (Year: 2016).*
Machine Translation of Steffen et al (Year: 2017).*
Machine Translation of You et al (Year: 2020).*

* cited by examiner

VEHICLE AIR VENT

CROSS-REFERENCE TO RELATED APPLICATION

This application claims priority from and the benefit of Korean Patent Application No. 10-2019-0077790, filed on Jun. 28, 2019, which is hereby incorporated by reference for all purposes as if set forth herein.

BACKGROUND

Field

Exemplary embodiments of the present disclosure relate to a vehicle air vent, and more particularly, to a vehicle air vent for achieving a reduction in ventilation resistance and an improvement in vertical wind directionality.

Discussion of the Background

In general, a vehicle is equipped with an air conditioning system to control the interior temperature thereof, and the cold and warm air generated by the air conditioning system is supplied to the interior of the vehicle through an air vent installed on an instrument panel. The air vent has a structure that is capable of controlling the direction and volume of air.

Since the air vent has a hollow outlet which impairs the aesthetics of the interior design of the vehicle, there are increasing cases where decorative components including decorations such as in the form of chrome plating are placed on the outlet of the air vent to improve the design. The decorations of the decorative components are typically represented in the form of strips extending laterally at the center of the outlet.

As such, when the decorative components are placed on the outlet of the air vent, the substantial width of the outlet is reduced in proportion to the cross-sectional areas of the decorative components, resulting in an increase in ventilation resistance, a reduction in the volume of substantially discharged air, and interference in vertical wind directionality. As a result, air conditioning performance may be deteriorated as a whole. Therefore, it is necessary to improve this issue.

The related art of the present disclosure is disclosed in Korean Patent Application Publication No. 2010-0058374 (published on Jun. 3, 2010, entitled "Air Vent").

SUMMARY

Various embodiments are directed to a vehicle air vent capable of achieving a reduction in ventilation resistance and an improvement in vertical wind directionality in placing a decorative component on an air vent discharge end.

In an embodiment, there is provided a vehicle air vent that includes a duct having a channel therein through which air flows, and having a discharge end through which the air is discharged, a first adjuster installed in the duct so as to be rotatable about a first rotary shaft, an extending direction of a first opening through which the air passes being varied depending on the angle of rotation of the first adjuster, a second adjuster installed in the duct so as to be rotatable about a second rotary shaft orthogonal to the first rotary shaft, an extending direction of a second opening through which the air passes being varied depending on the angle of rotation of the second adjuster, a third adjuster installed on the discharge end so as to be rotatable about a third rotary shaft parallel to the first rotary shaft, a third opening being defined between the third adjuster and the duct, and an interlocking connector operatively connecting the first adjuster to the third adjuster.

The first adjuster may include a blade support connected to the first rotary shaft in the duct while being in contact with a side wall of the duct, an upper blade disposed at an upper portion of the blade support while being in contact with an upper portion of the duct, and a lower blade disposed at a lower portion of the blade support while being in contact with a lower portion of the duct, the first opening being defined between the upper blade and the lower blade.

The upper blade may include an upper arc portion having an arc shape in cross section while being in surface contact with the upper portion of the duct, the upper arc portion being configured such that its upstream end is kept in contact with the upper portion of the duct with the first opening extending upward, and an upper inclined portion extending rectilinearly beneath the upper arc portion while being in contact with the first opening, the upper inclined portion being inclined toward the lower blade such that a vertical width of the first opening is reduced toward the discharge end.

The lower blade may include a lower arc portion having an arc shape in cross section while being in surface contact with the lower portion of the duct, the lower arc portion being configured such that its upstream end is kept in contact with the lower portion of the duct with the first opening extending downward, and a lower inclined portion extending rectilinearly above the lower arc portion while being in contact with the first opening, the lower inclined portion being inclined toward the upper blade such that a vertical width of the first opening is reduced toward the discharge end.

The first adjuster may further include a guide partition extending in the extending direction of the first opening between the upper blade and the lower blade.

The second adjuster may include upright blades connected to the second rotary shaft in the duct and having an upright panel shape, the upright blade being disposed laterally.

The third adjuster may include an extension support connected to the third rotary shaft in the duct and extending laterally on the discharge end, and a decoration formed at an end of the extension support and forming an interior design of a vehicle.

The third adjuster may further include a control knob protruding from the extension support to the outside of the discharge end.

The interlocking connector may include a first gearing coaxially connected to the first rotary shaft, a third gearing coaxially connected to the third rotary shaft and rotated in a reverse direction along with the forward rotation of the first gearing, and a second gearing disposed between the first gearing and the third gearing and transmitting the rotational force of the first gearing to the third gearing.

The second gearing may include a second input gear engaging with the first gearing and rotated in the reverse direction along with the forward rotation of the first gearing, and a second output gear engaging with the second input gear and the third gearing and rotated in a forward direction along with the reverse rotation of the second input gear.

The interlocking connector may include a first link bar connected to the first rotary shaft, and a second link bar hinged, at one end thereof, to the third adjuster and hinged, at the other end thereof, to the first link bar, the first link bar and the third adjuster being rotated in different directions by the second link bar.

As apparent from the above description, according to the vehicle air vent of the present disclosure, it is possible to adjust the horizontal wind direction by the second adjuster and to more stably adjust the vertical wind direction while rotating the third adjuster, disposed at the discharge end of the duct, along with the rotation of the first adjuster by the interlocking connector.

According to the present disclosure, when the angle of the first adjuster is adjusted, the third adjuster disposed at the discharge end of the duct is rotated at an angle for smoothly guiding the flow of air along with the rotation of the first adjuster. Accordingly, compared to the related art in which the third adjuster is simply fixed and disposed on the discharge end, it is possible to significantly reduce the ventilation resistance without interference with the flow and discharge of air. Rather, since the third adjuster functions to clearly guide the final discharge direction of air to a set direction, it is possible to further improve the wind direction control performance. Therefore, when the third adjuster is used as a decorative component, it is possible to achieve a reduction in ventilation resistance and an improvement in vertical wind directionality.

DETAILED DESCRIPTION OF THE ILLUSTRATED

Embodiments

Hereinafter, a vehicle air vent will be described below with reference to the accompanying drawings through various exemplary embodiments. It should be noted that the drawings are not necessarily to scale and may be exaggerated in thickness of lines or sizes of components for clarity and convenience of description. Furthermore, the terms as used herein are terms defined in consideration of functions of the disclosure and may change depending on the intention or practice of a user or an operator. Therefore, these terms should be defined based on the overall disclosure set forth herein.

Figure 1:
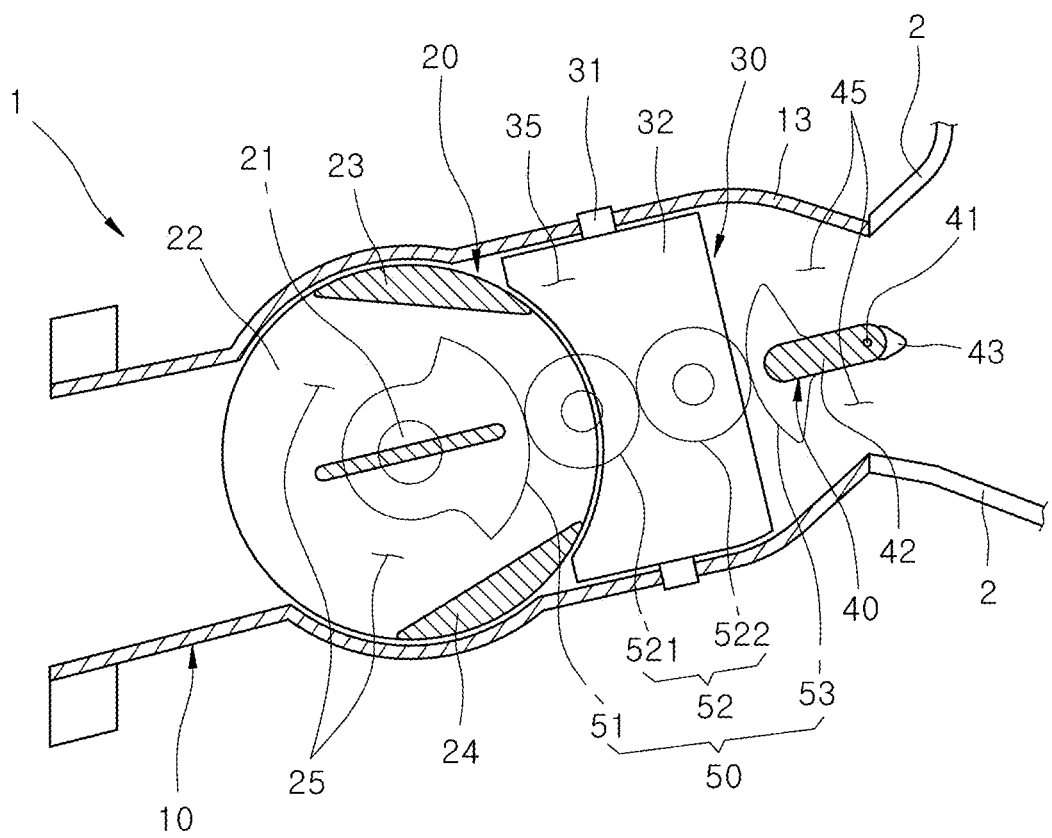
FIG. 1 is a main longitudinal sectional view schematically illustrating a vehicle air vent according to an embodiment of the present disclosure.
Figure 2:
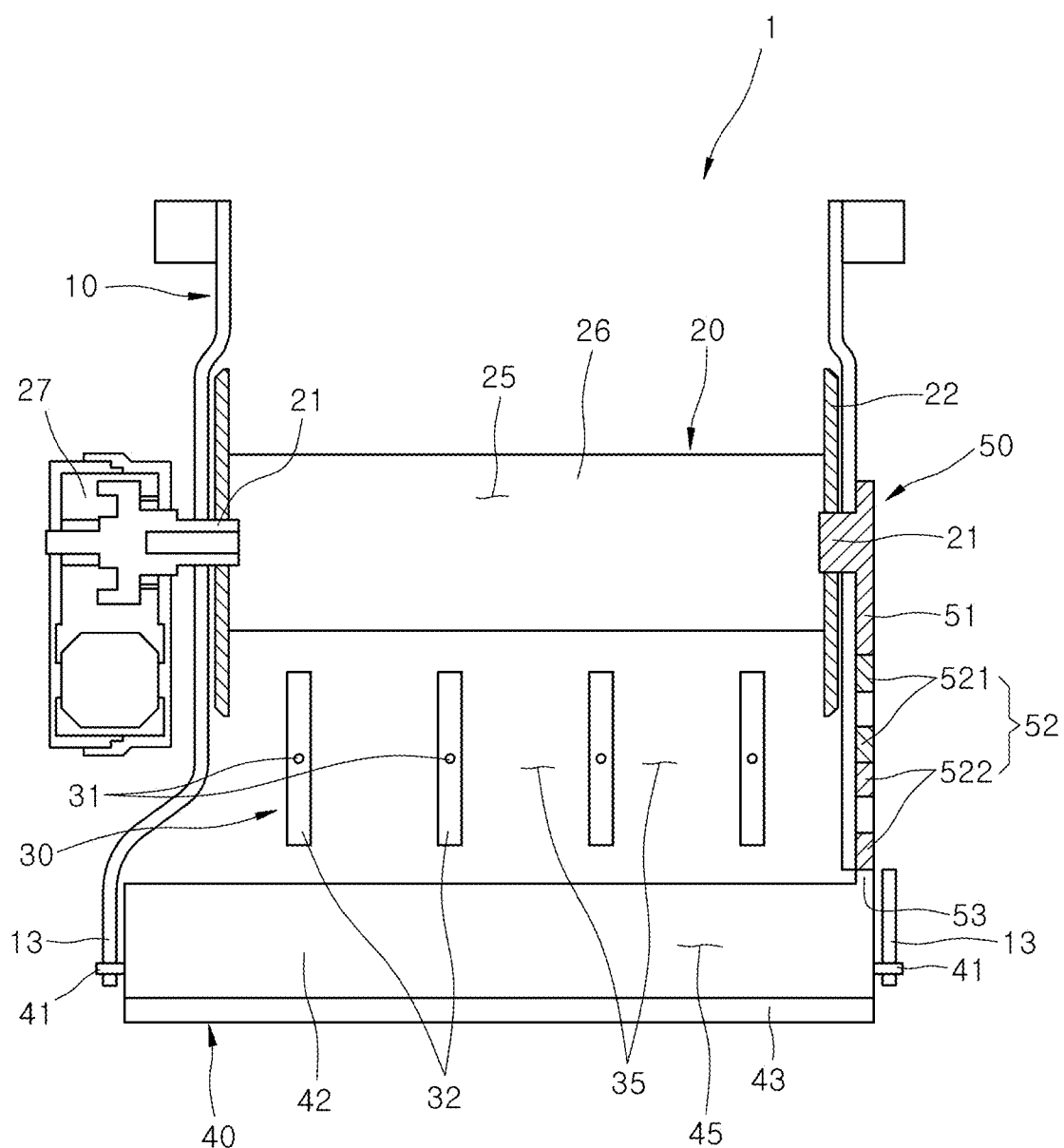
FIG. 2 is a main cross-sectional view schematically illustrating the vehicle air vent according to the embodiment of the present disclosure.

FIG. 1 is a main longitudinal sectional view schematically illustrating a vehicle air vent according to an embodiment of the present disclosure. FIG. 2 is a main cross-sectional view schematically illustrating the vehicle air vent according to the embodiment of the present disclosure.

Referring to FIGS. 1 and 2, the vehicle air vent, which is designated by reference numeral 1, according to the embodiment of the present disclosure includes a duct 10, a first adjuster 20, a second adjuster 30, a third adjuster 40, and an interlocking connector 50.

The duct 10 has a channel therein through which air may flow, and is installed on an instrument panel. The cold and warm air generated by an air conditioning system is supplied to the interior of a vehicle through a discharge end 13 of the duct 10. As used herein, the discharge end 13 of the duct 10 refers to an opening in the duct 10, which is exposed to the interior of the vehicle.

The first adjuster 20 is an element that controls a vertical flow of air. The first adjuster 20 has a first opening 25 through which air may pass, and is installed in the duct 10 so as to be rotatable about a first rotary shaft 21. The first rotary shaft 21 is laterally installed in the duct 10, and the first adjuster 20 is rotated in a forward or reverse direction about the first rotary shaft 21. An extending direction of the first opening 25 is varied upward or downward depending on the angle of rotation of the first adjuster 20.

The second adjuster 30 is an element that controls a horizontal flow of air. The second adjuster 30 has a second opening 35 through which air may pass, and is rotatably installed in the duct 10. The second adjuster 30 is installed so as to be rotatable about a second rotary shaft 31 orthogonal to the first rotary shaft 21. The second rotary shaft 31 is vertically installed in the duct 10, and the second adjuster 30 is rotated in a forward or reverse direction about the second rotary shaft 31. An extending direction of the second opening 35 is varied depending on the angle of rotation of the second adjuster 30.

The third adjuster 40 is an element that corresponds to a decorative component to improve the aesthetics of the discharge end 13, and is installed on the discharge end 13 so as to be rotatable about a third rotary shaft 41 parallel to the first rotary shaft 21. The third rotary shaft 41 is laterally installed in the duct 10, and the third adjuster 40 is rotated in a forward or reverse direction about the third rotary shaft 41 along with the rotation of the first adjuster 20. A third opening 45 is defined between the third adjuster 40 and the duct 10.

The interlocking connector 50 is an element that operatively connects the first adjuster 20 to the third adjuster 40, and may use a gear member, a link member, a belt member, or the like. The first adjuster 20 and the third adjuster 40 are interconnected by the interlocking connector 50 so as to transmit power therebetween, so that, when the first adjuster 20 rotates, the third adjuster 40 rotates in a direction and at an angle corresponding thereto. On the contrary, by the interlocking connector 50, when the third adjuster 40 rotates, the first adjuster 20 may rotate in a direction and at an angle corresponding thereto.

Referring to FIGS. 1 and 2, the first adjuster 20 according to the embodiment of the present disclosure includes a first rotary shaft 21, a blade support 22, an upper blade 23, a lower blade 24, and a guide partition 26.

The first rotary shaft 21 is an element about which the first adjuster 20 rotates, and extends laterally from a side wall of the duct 10. The blade support 22 is connected to the first rotary shaft 21 in the duct 10, and is in contact with the side wall of the duct 10. The blade support 22 may have a disk shape with the first rotary shaft 21 centered thereon. In this case, the inside of the duct 10, in which the blade support 22 is accommodated, has a laterally extending circumferential shape, namely, an arc-shaped inner surface corresponding to the blade support 22.

The upper blade 23 is an element that is in contact with the upper portion of the first opening 25. The upper blade 23 is disposed at the upper portion of the blade support 22, and is in contact with the upper portion of the duct 10. The lower blade 24 is an element that is in contact with the lower portion of the first opening 25. The lower blade 24 is disposed at the lower portion of the blade support 22, and is in contact with the lower portion of the duct 10. That is, the first opening 25 is defined between the upper blade 23 and the lower blade 24.

The upper blade 23 according to the embodiment of the present disclosure includes an upper arc portion 231 and an upper inclined portion 233. The upper arc portion 231 is an element that corresponds to the upper edge of the upper blade 23. The upper arc portion 231 has an arc shape in cross section, and is in surface contact with the upper portion of the duct 10. The upper portion of the duct 10 in contact with the upper blade 23 has an upward-concave arc shape in cross section, and is in surface contact with the upper arc portion 231.

The present disclosure mainly functions to control the flow of air. Therefore, the above contact described herein is not limited to close contact, but encompasses that there is a negligible clearance enough not to affect the overall flow of air.

The upper arc portion 231 is configured such that its upstream end 232 is kept in contact with the upper portion of the duct 10 with the first opening 25 extending upward. In the description of the first and third adjusters 20 and 40, the upward direction from the center of the discharge end 13 is referred to as an upward direction, the direction toward the center of the discharge end 13 is referred to as a horizontal direction, and the downward direction from the center of the discharge end 13 is referred to as a downward direction.

The upper inclined portion 233 is an element that corresponds to the lower edge of the upper blade 23. The upper inclined portion 233 is formed beneath the upper arc portion 231 while extending rectilinearly in the extending direction of the duct 10, and is in contact with the upper portion of the first opening 25. The upper inclined portion 233 is shaped to be inclined downward toward the lower blade 24 toward the discharge end 13 such that the vertical width of the first opening 25 is reduced toward the discharge end 13.

The lower blade 24 according to the embodiment of the present disclosure includes a lower arc portion 241 and a lower inclined portion 243. The lower arc portion 241 is an element that corresponds to the lower edge of the lower blade 24. The lower arc portion 241 has an arc shape in cross section, and is in surface contact with the lower portion of the duct 10. The lower portion of the duct 10 in contact with the lower blade 24 has a downward-concave arc shape in cross section, and is in surface contact with the lower arc portion 241.

The lower arc portion 241 is configured such that its upstream end 242 is kept in contact with the lower portion of the duct 10 with the first opening 25 extending downward. The lower inclined portion 243 is formed above the lower arc portion 241 while extending rectilinearly in the extending direction of the duct 10, and is in contact with the lower portion of the first opening 25. The lower inclined portion 243 is shaped to be inclined upward toward the upper blade 23 such that the vertical width of the first opening 25 is reduced toward the discharge end 13.

As the upper inclined portion 233 is shaped to be inclined downward toward the lower blade 24 toward the discharge end 13 and the lower inclined portion 243 is shaped to be inclined upward toward the upper blade 23, the first opening 25 is shaped such that the vertical width thereof is reduced toward the discharge end 13. Thus, air can be smoothly introduced into the first opening 25 while the flow of air can be guided more stably in an intended direction.

The guide partition 26 extends in the extending direction of the first opening 25 between the upper blade 23 and the lower blade 24. The guide partition 26 is disposed on the same axis as the first rotary shaft 21, and has both ends connected to the blade support 22. The first rotary shaft 21, the blade support 22, and the guide partition 26 are rotated by the same angular displacement.

The first opening 25 may be divided into upper and lower portions by the guide partition 26. More specifically, the first opening 25 may be divided into an upper space (drawing symbol not marked) between the guide partition 26 and the upper blade 23 and a lower space (drawing symbol not marked) between the guide partition 26 and the lower blade 24. The air flowing into the first opening 25 is concentrated on one of the upper and lower portions of the first opening 25 while the guide partition 26 is inclined upward or downward, but is uniform in the upper and lower portions of the first opening 25 while the guide partition 26 is placed horizontally.

Referring to FIGS. 1 and 2, the second adjuster 30 according to the embodiment of the present disclosure may consist of a plurality of second adjusters, each of which includes a second rotary shaft 31 and an upright blade 32.

The second rotary shaft 31 is an element about which the second adjuster 30 rotates, and extends vertically from the upper portion to the lower portion of the duct 10. The upright blade 32 is connected to the second rotary shaft 31 in the duct 10 and has an upright panel shape. The plurality of second adjusters 30 are arranged laterally. The second opening 35 is defined between the upright blades 32 so that air may pass through the second opening 35.

The plurality of second rotary shafts 31 or upright blades 32 are interconnected by a connection member (not illustrated) and rotated by the same angular displacement. Since the connection member configured to rotate the upright blades 32 by the same angular displacement is not specifically limited in structure and shape, including known techniques, a detailed description thereof will be omitted.

When the upright blades 32 are rotated to the right about the respective second rotary shafts 31, the wind direction is adjusted to the right, and when the upright blades 32 are rotated to the left about the respective second rotary shafts 31, the wind direction is adjusted to the left. When an upright blade 32 is rotated to the right or left as far as possible until its end comes into contact with the end of an adjacent upright blade 32, the second opening 35 may be closed to block the flow of air.

Referring to FIGS. 1 and 2, the third adjuster 40 according to the embodiment of the present disclosure includes a third rotary shaft 41, an extension support 42, and a decoration 43.

The third rotary shaft 41 is an element about which the third adjuster 40 rotates, and is installed on the discharge end 13 to extend laterally from the side wall of the duct 10. The extension support 42 extends laterally in the duct 10 and has both ends connected to the third rotary shaft 41.

The decoration 43 is an element that forms the interior design of the vehicle, i.e., a decoration, on the discharge end 13 of the duct 10, and is formed on the exposed end of the extension support 42 to the outside. The decoration 43 may be in the form of chrome plating or the like, and may be implemented in various other textures and colors in consideration of harmony with a garnish 2 disposed outside the duct 10. The decoration 43 is represented in the form of a strip extending laterally at the vertical middle of the discharge end 13.

Figure 3:
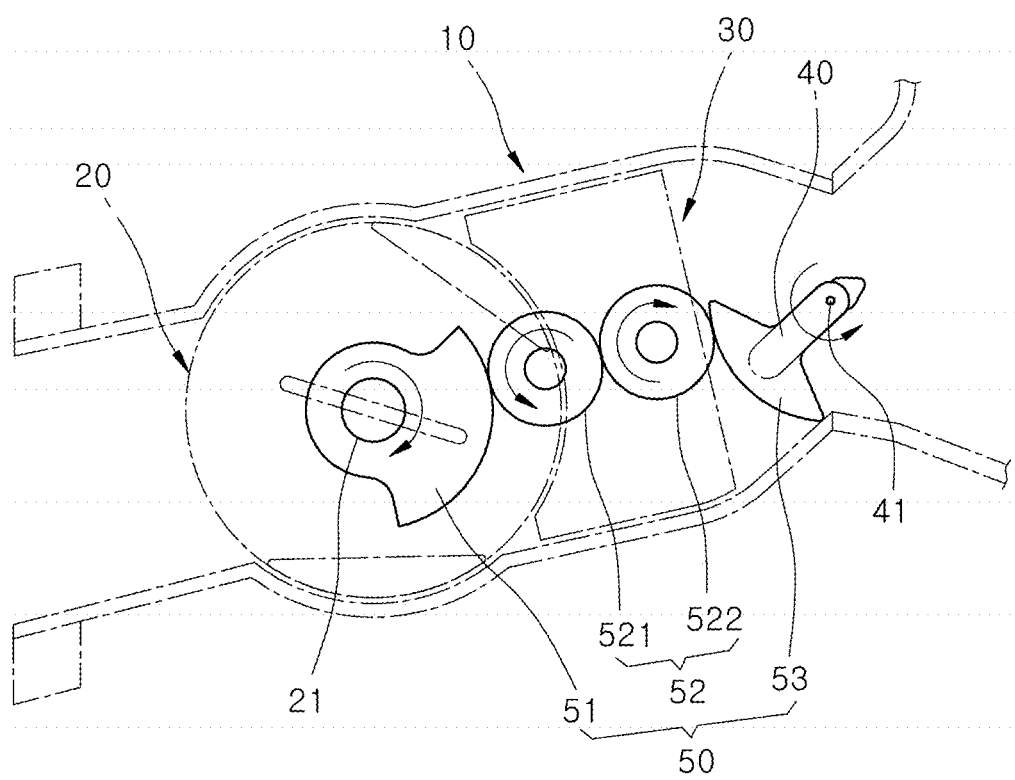
FIG. 3 is a conceptual view for explaining an operation of an interlocking connector of the vehicle air vent according to the embodiment of the present disclosure.

FIG. 3 is a conceptual view for explaining an operation of the interlocking connector of the vehicle air vent according to the embodiment of the present disclosure.

Referring to FIGS. 1 to 3, the interlocking connector 50 according to the embodiment of the present disclosure includes a first gearing 51, a second gearing 52, and a third gearing 53.

The first gearing 51 is coaxially connected to the first rotary shaft 21. The third gearing 53 is coaxially connected to the third rotary shaft 41. The second gearing 52 is disposed between the first gearing 51 and the third gearing 53 and transmits the rotational force of the first gearing 51 to the third gearing 53. The second gearing 52 according to the embodiment of the present disclosure includes a second input gear 521 and a second output gear 522.

The second input gear 521 engages with the first gearing 51 and is rotated in a reverse direction along with the forward rotation of the first gearing 51. The second output gear 522 is disposed between the second input gear 521 and the third gearing 53, and engages, at one side and the other side thereof, with the respective second input gear 521 and third gearing 53. The second output gear 522 is rotated in a forward direction along with the reverse rotation of the second input gear 521.

When the first rotary shaft 21 is rotated in the forward direction as illustrated in FIG. 3, the first gearing 51 is rotated by the same angular displacement as the first rotary shaft 21, the second input gear 521 is rotated in the reverse direction, the second output gear 522 is rotated in the forward direction along with the reverse rotation of the second input gear 521, and the third gearing 53 is rotated in the reverse direction. In this case, the third rotary shaft 41 is rotated by the same angular displacement as the third gearing 53. Through such an action, the first adjuster 20 and the third adjuster 40 are operatively connected to each other and rotated in different directions.

Figure 4:
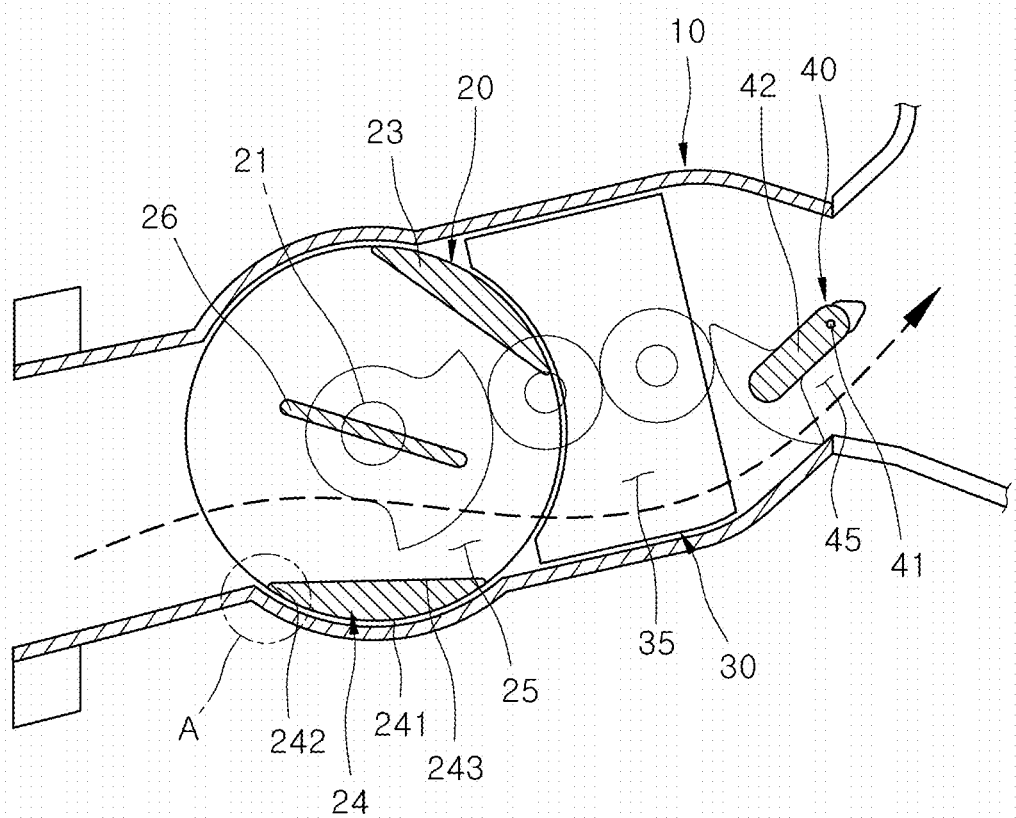
FIG. 4 is a view schematically illustrating an operation state of the vehicle air vent according to the embodiment of the present disclosure, through which air is discharged upward.
Figure 5:
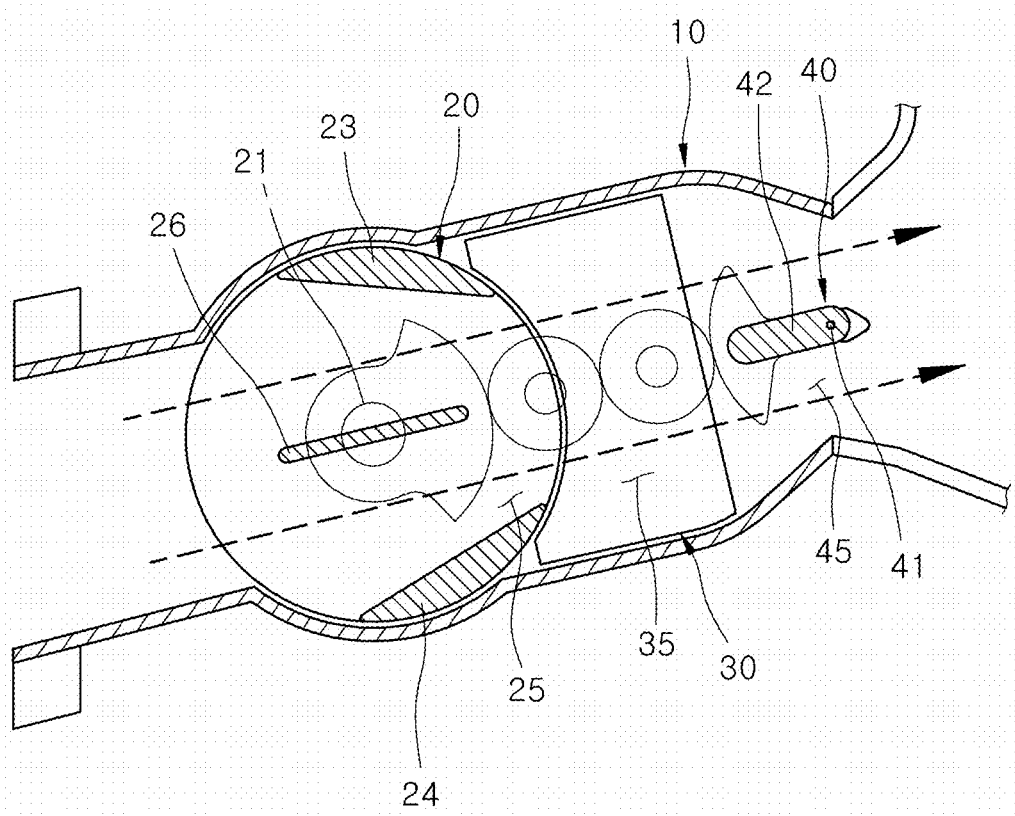
FIG. 5 is a view schematically illustrating an operation state of the vehicle air vent according to the embodiment of the present disclosure, through which air is discharged horizontally.
Figure 6:
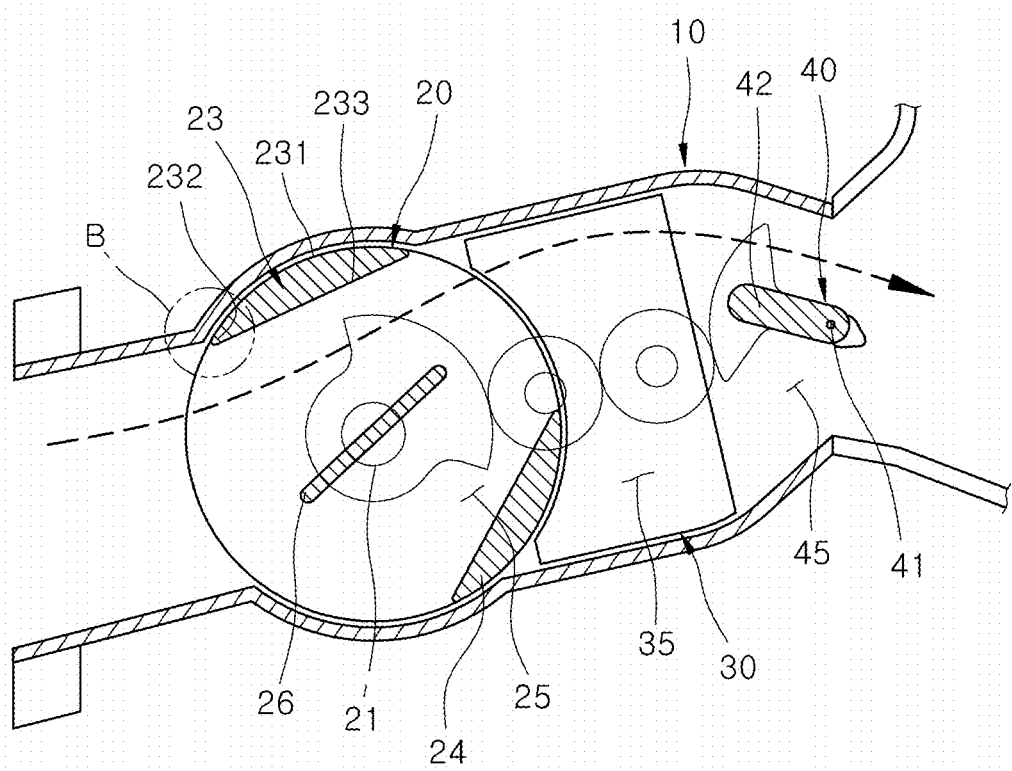
FIG. 6 is a view schematically illustrating an operation state of the vehicle air vent according to the embodiment of the present disclosure, through which air is discharged downward.

FIG. 4 is a view schematically illustrating an operation state of the vehicle air vent according to the embodiment of the present disclosure, through which air is discharged upward. FIG. 5 is a view schematically illustrating an operation state of the vehicle air vent according to the embodiment of the present disclosure, through which air is discharged horizontally. FIG. 6 is a view schematically illustrating an operation state of the vehicle air vent according to the embodiment of the present disclosure, through which air is discharged downward.

In the case where the first adjuster 20 and the third adjuster 40 are operatively connected to each other by the interlocking connector 50 and rotated in different directions, when the first adjuster 20 is rotated upward as illustrated in FIG. 6, the third adjuster 40 is rotated downward, when the first adjuster 20 is rotated downward as illustrated in FIG. 4, the third adjuster 40 is rotated upward, and when the first adjuster 20 is placed horizontally as illustrated in FIG. 5, the third adjuster 40 is placed horizontally.

Based on the state illustrated in FIG. 5, when the first adjuster 20 is rotated downward in the forward direction as illustrated in FIG. 4, the third adjuster 40 rotates to be inclined upward toward the discharge end 13. The air flowing toward the discharge end 13 in the duct 10 is mainly introduced into the lower portion of the first opening 25 by the guide partition 26.

The air passes through the first opening 25 along the lower inclined portion 243 of the lower blade 24, and then passes through the second opening 35 along the bottom of the duct 10 to continuously pass through the lower portion of the third opening 45 defined beneath the extension support 42. In this case, the air introduced downward into the first opening 25 flows gradually upward while passing through the second opening 35, and is finally discharged upward through the third opening 45.

As described above, the upstream end 242 of the lower arc portion 241 is kept in contact with the lower portion of the duct 10 as illustrated in region A in the state in which the first adjuster 20 is rotated downward to the maximum. Thus, when the wind direction is vertically adjusted by the first adjuster 20, it is possible to prevent the lower blade 24 from interfering with the air and to further reduce the ventilation resistance.

As illustrated in FIG. 5, when the first and third adjusters 20 and 40 are placed horizontally such that the extension directions of the first and third openings 25 and 45 are parallel to the extension direction of the duct 10, the air continues to rectilinearly pass through the first opening 25, the second opening 35, and the third opening 45 and is discharged out of the discharge end 13.

Based on the state illustrated in FIG. 5, when the first adjuster 20 is rotated downward in the reverse direction as illustrated in FIG. 6, the third adjuster 40 rotates to be inclined downward toward the discharge end 13. The air flowing toward the discharge end 13 in the duct 10 is mainly introduced into the upper portion of the first opening 25 by the guide partition 26.

The air passes through the first opening 25 along the upper inclined portion 233 of the upper blade 23, and then passes through the second opening 35 along the ceiling of the duct 10 to continuously pass through the upper portion of the third opening 45 defined above the extension support 42. In this case, the air introduced upward into the first opening 25 flows gradually downward while passing through the second opening 35, and is finally discharged downward through the third opening 45.

As described above, the upstream end 232 of the upper arc portion 231 is kept in contact with the upper portion of the duct 10 as illustrated in region B in the state in which the first adjuster 20 is rotated upward to the maximum. Thus, when the wind direction is vertically adjusted by the first adjuster 20, it is possible to prevent the upper blade 23 from interfering with the air and to further reduce the ventilation resistance.

Figure 7:
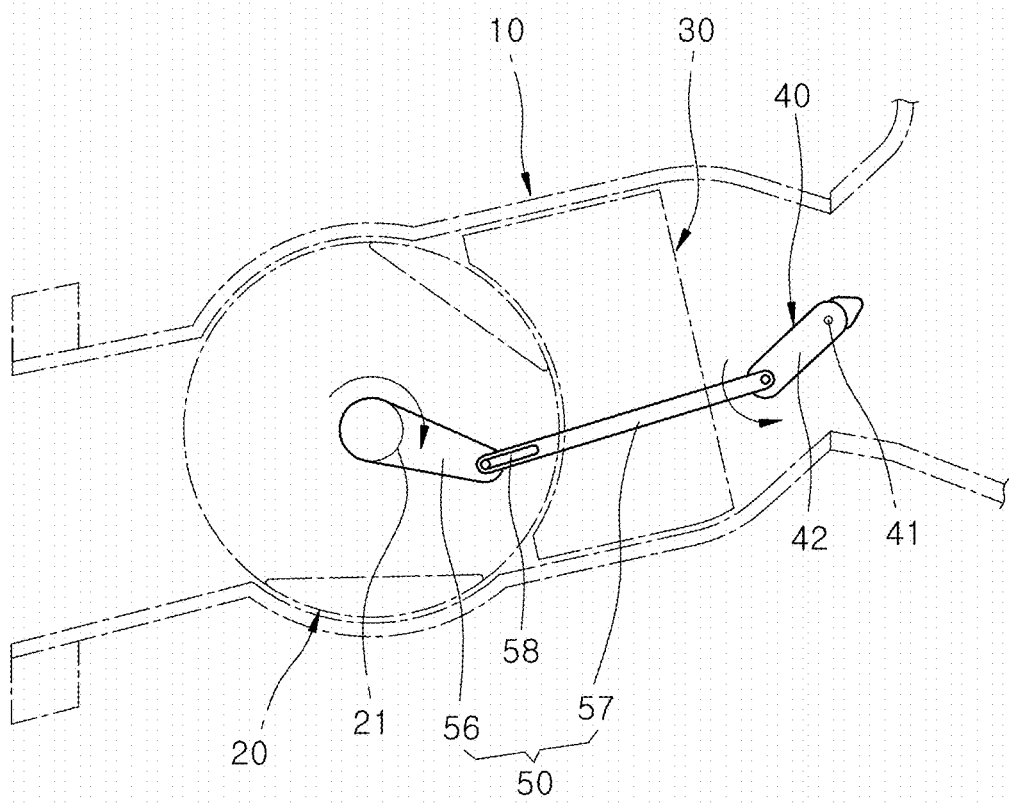
FIG. 7 is a main longitudinal sectional view schematically illustrating an interlocking connector of a vehicle air vent according to another embodiment of the present disclosure.

FIG. 7 is a main longitudinal sectional view schematically illustrating an interlocking connector of a vehicle air vent according to another embodiment of the present disclosure.

Referring to FIG. 7, the interlocking connector, which is designated by reference number 50, according to another embodiment of the present disclosure includes a first link bar 56 and a second link bar 57.

One end of the first link bar 56 is connected to a first rotary shaft 21 and the other end thereof extends toward a third adjuster 40. One end of the second link bar 57 is hinged to the third adjuster 40 and the other end thereof is hinged to the first link bar 56. The second link bar 57 has a slit 58 formed in its hinge coupling portion with the first link bar 56 so that a hinge shaft is guided in the slit 58.

When the first rotary shaft 21 is rotated in a forward direction as illustrated in FIG. 7, the first link bar 56 is rotated in the forward direction along with the forward rotation of the first rotary shaft 21, the second link bar 57 connected to the first link bar 56 is moved downward, and the third adjuster 40 connected to the second link bar 57 is rotated in a reverse direction about a third rotary shaft 41. The first adjuster 20 and the third adjuster 40 may be operatively interconnected by the interlocking connector 50 and rotated in different directions.

Figure 8:
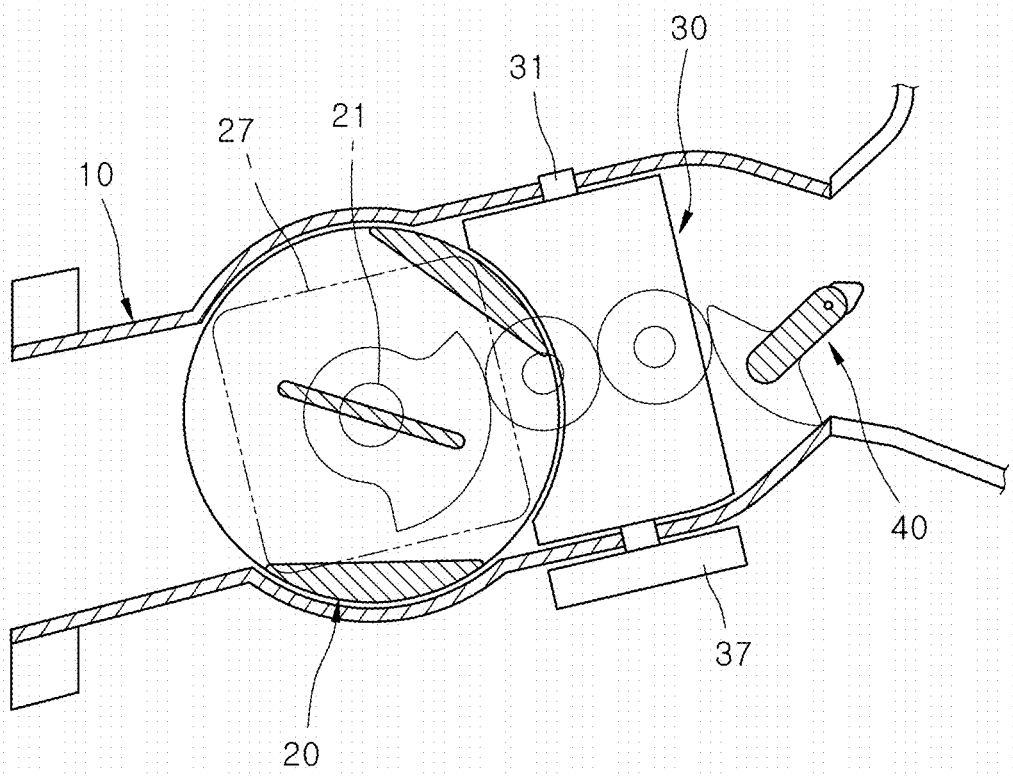
FIG. 8 is a view schematically illustrating an exemplary operation state of the vehicle air vent according to the embodiment of the present disclosure, in which an air discharge direction is adjusted electrically.

FIG. 8 is a view schematically illustrating an exemplary operation state of the vehicle air vent according to the embodiment of the present disclosure, in which an air discharge direction is adjusted electrically.

As illustrated in FIG. 8, the first rotary shaft 21 of the first adjuster 20 is connected to a first actuator 27, and the second rotary shaft 31 or connection member (not illustrated) of the second adjuster 30 is connected to a second actuator 37. Thus, the first adjuster 20, the second adjuster 30, and the third adjuster 40 may be electrically operated by button operation or the like, to adjust a vertical wind direction and a horizontal wind direction.

Figure 9:
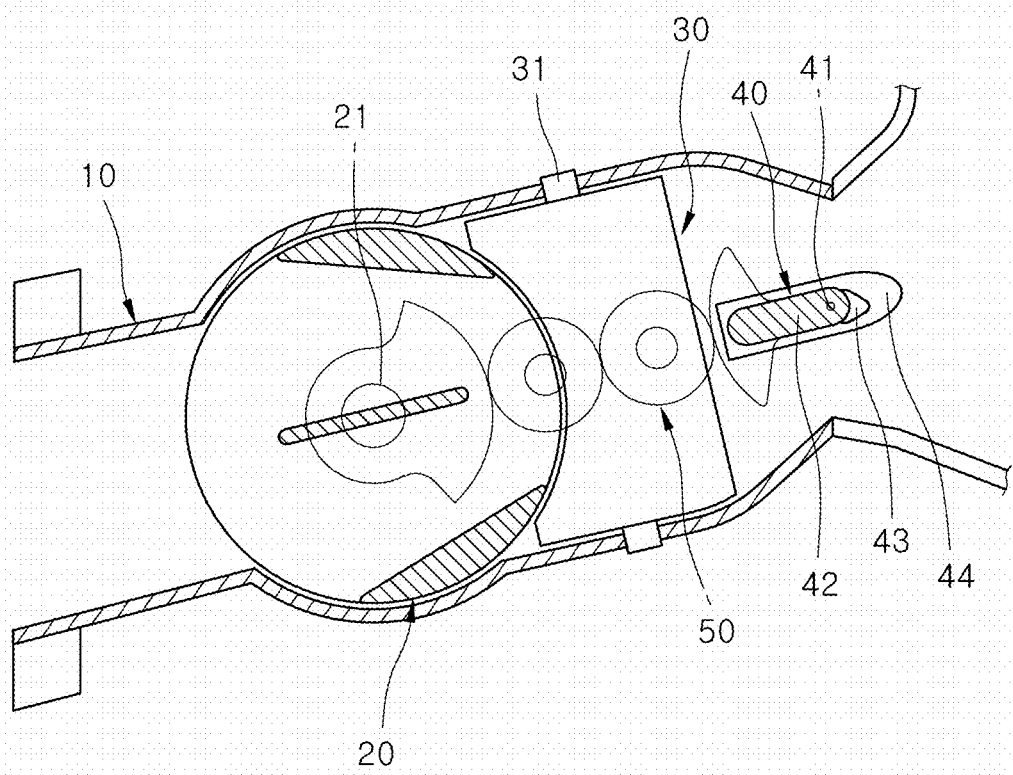
FIG. 9 is a view schematically illustrating an exemplary operation state of the vehicle air vent according to the embodiment of the present disclosure, in which an air discharge direction is adjusted manually.

FIG. 9 is a view schematically illustrating an exemplary operation state of the vehicle air vent according to the embodiment of the present disclosure, in which an air discharge direction is adjusted manually.

As illustrated in FIG. 9, a control knob 44 protrudes from the extension support 42 of the third adjuster 40 to the outside of the discharge end 13 so that the control knob 44 may be gripped by hand. Thus, an occupant may grip the control knob 44 and apply an upward force or a downward force to the extension support 42, thereby manually adjusting the angles of the third and first adjusters 40 and 20.

Figure 10:
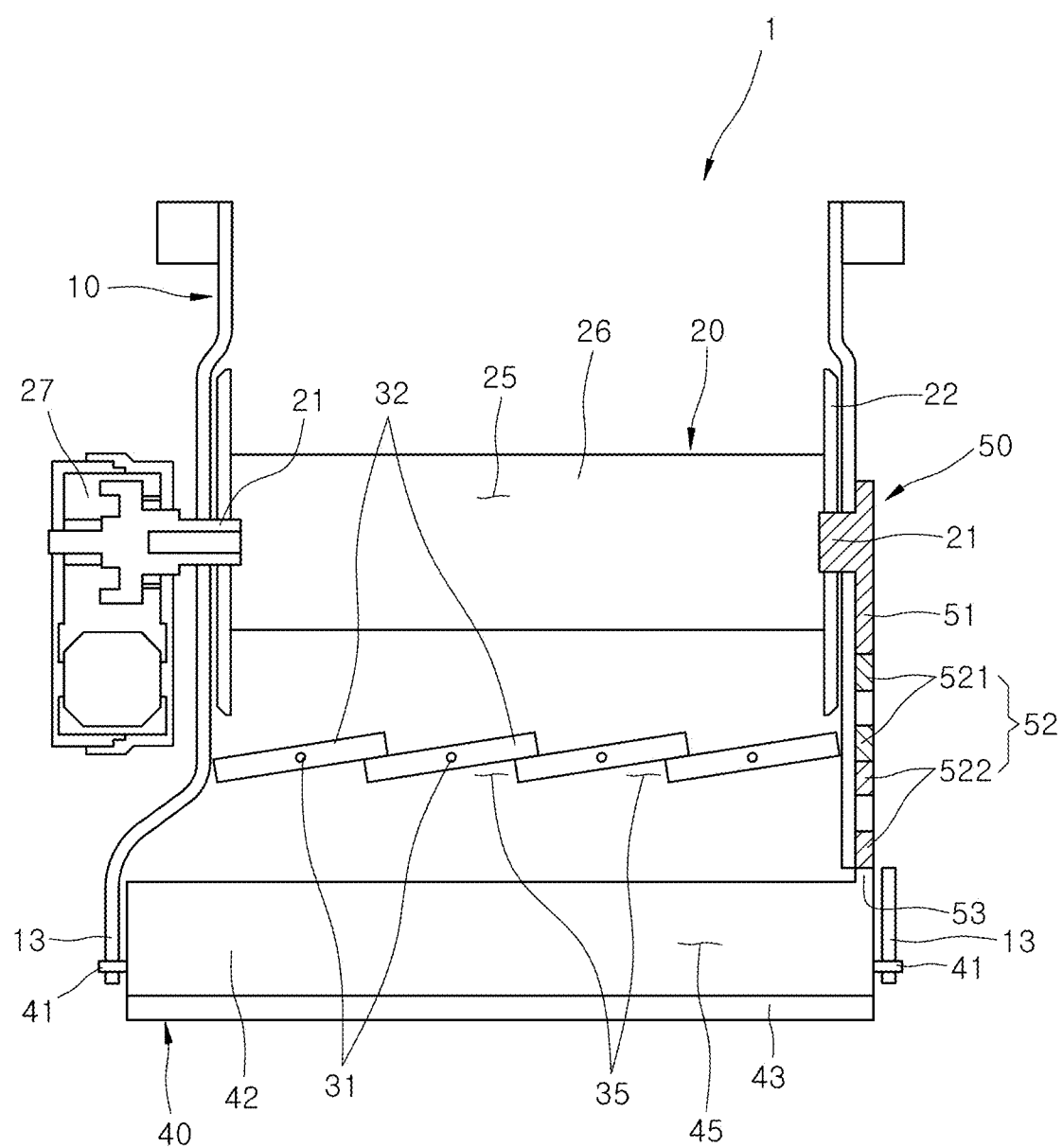
FIG. 10 is a view schematically illustrating an operation state of the vehicle air vent according to the embodiment of the present disclosure, in which air discharge is blocked by a second adjuster of the vehicle air vent.

FIG. 10 is a view schematically illustrating an operation state of the vehicle air vent according to the embodiment of the present disclosure, in which air discharge is blocked by the second adjuster.

When the upright blades 32 of the second adjusters 30 are rotated to the right about the respective second rotary shafts 31, the wind direction is adjusted to the right, and when the upright blades 32 are rotated to the left about the respective second rotary shafts 31, the wind direction is adjusted to the left. When an upright blade 32 is rotated to the right or left as far as possible until its end comes into contact with the end of an adjacent upright blade 32 as illustrated in FIG. 10, the second opening 35 may be closed to block the flow of air.

According to the vehicle air vent 1 of the present disclosure having the above configuration, it is possible to adjust the horizontal wind direction by the second adjuster 30 and to more stably adjust the vertical wind direction while rotating the third adjuster 40, disposed at the discharge end 13 of the duct 10, along with the rotation of the first adjuster 20 by the interlocking connector 50.

According to the present disclosure, when the angle of the first adjuster 20 is adjusted, the third adjuster 40 disposed at the discharge end 13 of the duct 10 is rotated at an angle for smoothly guiding the flow of air along with the rotation of the first adjuster 20. Accordingly, compared to the related art in which the third adjuster 40 is simply fixed and disposed on the discharge end 13, it is possible to significantly reduce the ventilation resistance without interference with the flow and discharge of air. Rather, since the third adjuster 40 functions to clearly guide the final discharge direction of air to a set direction, it is possible to further improve the wind direction control performance. Therefore, when the third adjuster 40 is used as a decorative component, it is possible to achieve a reduction in ventilation resistance and an improvement in vertical wind directionality.

Although the exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A vehicle air vent comprising:
    a duct having a channel therein through which air flows, and having a discharge end through which the air is discharged;
    a first adjuster installed in the duct and configured to rotate about a first rotary shaft, an extending direction of a first opening through which the air passes being varied depending on an angle of rotation of the first adjuster;
    a second adjuster installed in the duct and configured to rotate about a second rotary shaft orthogonal to the first rotary shaft, an extending direction of a second opening through which the air passes being varied depending on an angle of rotation of the second adjuster;
    a third adjuster installed on the discharge end and configured to rotate about a third rotary shaft parallel to the first rotary shaft, a third opening being defined between the third adjuster and the duct; and
    an interlocking connector configured to operatively connect the first adjuster to the third adjuster to transmit power,
    wherein the third adjuster comprises:
        an extension support connected to the third rotary shaft in the duct and extending laterally on the discharge end,
        a decoration disposed on an entire exposed end of the extension support to form a strip extending laterally along the entire exposed extension support, and
        a control knob protruding from the extension support to an outside of the discharge end and configured to adjust angles of the first and third adjusters by applying a force to the extension support by a user, and
    wherein when the first adjuster rotates, the third adjuster rotates in an opposite direction to the first adjuster.

2. The vehicle air vent according to claim 1, wherein the first adjuster comprises:
    a blade support connected to the first rotary shaft in the duct while being in contact with a side wall of the duct;
    an upper blade disposed at an upper portion of the blade support while being in contact with an upper portion of the duct; and a lower blade disposed at a lower portion of the blade support while being in contact with a lower portion of the duct, wherein the first opening is defined between the upper blade and the lower blade.

3. The vehicle air vent according to claim 2, wherein the upper blade comprises:

an upper arc portion having an arc shape in a vertical cross section while being in surface contact with the upper portion of the duct, the upper arc portion being configured such that its upstream end is kept in contact with the upper portion of the duct with the first opening extending upward; and an upper inclined portion extending rectilinearly beneath the upper arc portion while being in contact with the first opening, the upper inclined portion being inclined toward the lower blade such that a vertical width of the first opening is reduced toward the discharge end.

4. The vehicle air vent according to claim 2, wherein the lower blade comprises:

a lower arc portion having an arc shape in a vertical cross section while being in surface contact with the lower portion of the duct, the lower arc portion being configured such that its upstream end is kept in contact with the lower portion of the duct with the first opening extending downward; and a lower inclined portion extending rectilinearly above the lower arc portion while being in contact with the first opening, the lower inclined portion being inclined toward the upper blade such that a vertical width of the first opening is reduced toward the discharge end.

5. The vehicle air vent according to claim 2, wherein the first adjuster further comprises a guide partition configured to divide the first opening into an upper space between the guide partition and the upper blade and a lower space between the guide partition and the lower blade, the guide partition extending in the extending direction of the first opening between the upper blade and the lower blade.

6. The vehicle air vent according to claim 1, wherein the second adjuster comprises upright blades each connected to a corresponding second rotary shaft in the duct and having an upright panel shape, the upright blades being disposed laterally, and wherein each upright blade is configured to rotate right or left until its end contacts an end of an adjacent upright blade and blocks air flow through the second opening.

7. The vehicle air vent according to claim 1, wherein the interlocking connector comprises:

a first gearing coaxially connected to the first rotary shaft;

a third gearing coaxially connected to the third rotary shaft and rotated in a reverse direction along with a forward rotation of the first gearing; and a second gearing disposed between the first gearing and the third gearing and transmitting a rotational force of the first gearing to the third gearing.

8. The vehicle air vent according to claim 7, wherein the second gearing comprises:

a second input gear configured to engage with the first gearing and rotate in the reverse direction along with the forward rotation of the first gearing; and a second output gear configured to engage with the second input gear and the third gearing and rotate in a forward direction along with a reverse rotation of the second input gear.

9. The vehicle air vent according to claim 1, wherein the interlocking connector comprises:

a first link bar connected to the first rotary shaft; and a second link bar hinged, at one end thereof, to the third adjuster and hinged, at the other end thereof, to the first link bar, the first link bar and the third adjuster being operatively interconnected and configured to rotate in different directions by the second link bar.

\* \* \* \* \*